Sept. 8, 1936.   P. SCHLUMBOHM   2,053,684
METHOD OF COOLING
Filed Dec. 8, 1932
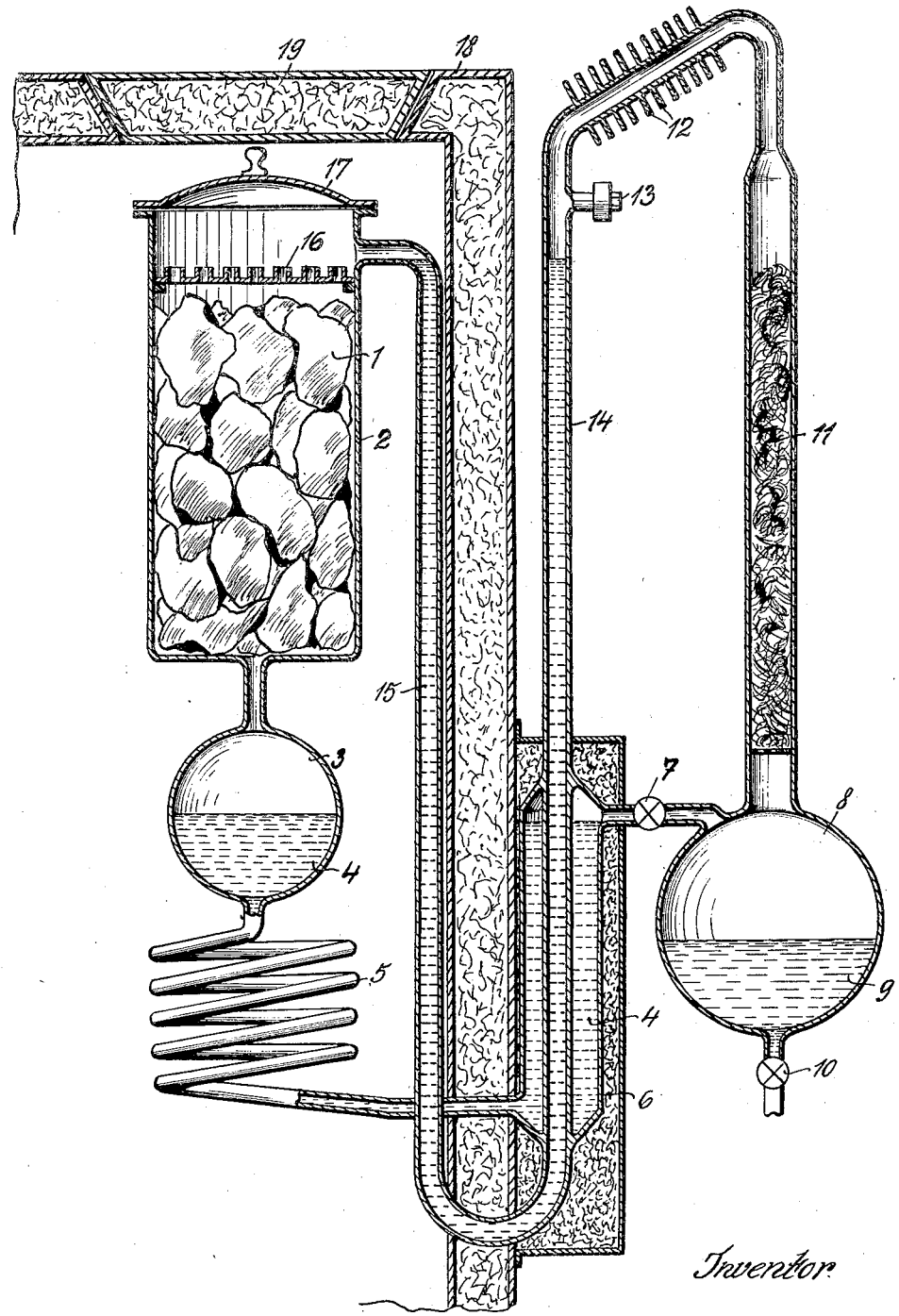
Inventor
Peter Schlumbohm Patented Sept. 8, 1936

2,053,684

UNITED STATES PATENT OFFICE 2,053,684

METHOD OF COOLING

Peter Schlumbohm, Berlin, Germany

Application December 8, 1932, Serial No. 646,237
In Germany December 14, 1931

5 Claims. (Cl. 62—170)

My invention relates to a method of cooling with the aid of a freezing mixture which contains water ice. It is an object of my invention to improve the temperature effect of water ice in the well known method of mixing the water ice with a substance which is soluble in water and an advantage of my invention is a more economical procedure than the methods heretofore known.

Further objects of the invention are the provision of an apparatus in which cooling by means of a freezing mixture containing water ice and a non-solid substance may be readily and economically carried out, and a freezing mixture having water ice as a principal constituent.

In the practice of my invention the substance which is added to the water ice is one which can be easily separated from the water later on. Heretofore the component which was mixed with the water ice was a solid and was lost and this expense hindered the adoption of the method of freezing with the aid of mixtures.

Thus, following my invention, my improved method entails:

First: to recover the substance or component from the water and to use it again in combination with a new mass of water ice.

Second: to separate the component from the water e. g. by distillation.

Third: to select a component, the boiling point of which and the physical-chemical properties of which allow a ready separation from the water by the method of distillation.

The new method of adding a component to water ice, of winning back the component from the water and of using the component with a new mass of water ice may be practiced also in a continuous process of cooling as illustrated in the accompanying drawing.

A particular feature of my invention is a cooling system in which the use of the freezing mixture is in a container which is removably placed inside of an icebox, or refrigerator, a truck, a car, a ship, or an aeroplane, and the transport of the transportable container, after its cooling effect has been used, to a central station where the contents of many of such containers are poured into the still of a distilling column for the purpose of recovering the component. The component which is thus rewon is used with fresh water ice to refill the transportable containers. Inasmuch as the technique of this feature is very simple it is not illustrated in a special drawing.

Before going into the details of the drawing, I want to point out the special nature of the substances or components which I prefer to use.

As previously stated I may separate the component from the water by distillation and I select a component the boiling point of which is lower than and differs sufficiently from the boiling point of water. From this point of view, ethyl alcohol is not the ideal component. Ethyl alcohol has been used in chemical laboratories to make a freezing mixture with ice, but here of course no chemist would ever think of winning the alcohol back from the water but would as a matter of course, pour the water in the sink. Had anyone previously thought of rewinning the component by distillation, he certainly would not have selected ethyl alcohol. However, ethyl alcohol is the only component besides salts and aqueous solutions of acids which is mentioned in chemical books relating to the subject.

From my new point of view I select a substance the boiling point of which is at least 30° C. lower than the boiling point of water, it being understood that the substance must be soluble in water. The substance may be a liquid or even a gas. When a gas is used, for instance ammonia, as a component of water ice, the container for the freezing mixture should be built as a pressure container and hermetically sealed with a lid. A hermetically sealed container may be used even if the component is a liquid.

A liquid which is very practical for my purpose is methyl alcohol.

In the accompanying drawing an installation is illustrated in which a liquid component like methyl alcohol is continuously added to water ice and continuously distilled from the water. Of course, the water ice must be renewed and the water formed by melting of the ice, after the distillation of the component, must be left out.

The water ice 1 is placed inside of a tank 2 which serves as a cooling tank inside of the ice box 18. When filling with water ice the lid 19 of the ice box, the lid 17 of the tank 2 and a perforated sheet 16 must be first removed. The liquid component, for instance methyl alcohol, enters into the upper part of the tank 2 and after being distributed by the sheet 16 trickles onto the ice 1, thus forming a freezing mixture and lowering the temperature below the freezing point of water. The cold brine 4 formed by the liquid component and the water ice, and the water from melting flows to a container 3 and through a cooling coil 5 or through other suitable cooling installations inside of the ice box 18. Then the cold brine 4 enters into a counter current heat exchanger formed by the outside tube 6 and by the inside tube 14. In this heat exchanger the cold of the brine is used for pre-cooling the liquid component 15 which flows inside of the tube 14. From the heat exchanger 6 the brine 4, regulated by a valve 7, flows over into the still 8. By heating the still 8 the component is distilled and the vapors of the component, after having been freed from water vapors, by means of the rectifier 11, are condensed by means of the condenser 12. The condensate flows through the tube 14 back to the tank 2. The water 9 in the still 8 is let out from time to time by means of a valve 10.

A special feature of my invention when applied in such a continuously working installation is a liquid seal formed by the condensed component 15 for the purpose of shutting off the condenser 12 against the tank 2 containing the water ice 1 in order to avoid condensation of the vapors on the water ice instead of in the condenser 12.

Another feature is the use of a U-shaped tube 14 for conducting the condensate 15 from the condenser 12 to the tank 2. In this U shaped tube the component 15 forms the liquid seal. A safety valve 13 is provided above the level of the condensate 15 at the tube 14 for letting out air and for relieving excess-pressure.

On the other hand the brine 4 forms a liquid seal in the lower part of the system for the purpose of shutting off the still 8 from the lower parts of the cooling installation inside of the ice-box.

The drawing illustrates the invention diagrammatically, in vertical section.

Having thus described the nature of my invention and having ascertained the manner in which the same is to be performed,

What I claim is:

1. A cooling apparatus, which comprises in combination a refrigerator, a cooling tank positioned within said refrigerator and containing a freezing mixture of water ice and a liquid which is soluble in water, a distilling apparatus positioned outside of the refrigerator whereby the aqueous solution formed in the cooling tank by melting of the ice may be separated into its components, a conduit between said cooling tank and said distilling apparatus whereby liquid from said cooling tank is conducted to said distilling apparatus, and another conduit between said distilling apparatus and said cooling tank through which condensate formed in the distilling apparatus is conducted to the cooling tank.

2. A cooling apparatus, which comprises in combination a refrigerator, a cooling tank positioned within said refrigerator and containing a freezing mixture of water ice and a liquid which is soluble in water, a distilling apparatus positioned outside of the refrigerator whereby the aqueous solution formed in the cooling tank by melting of the ice may be separated into its components, a conduit between said cooling tank and said distilling apparatus whereby liquid from said cooling tank is conducted to said distilling apparatus, and another conduit between said distilling apparatus and said cooling tank through which condensate formed in the distilling apparatus is conducted to the cooling tank, said second mentioned conduit having a liquid seal formed of condensate produced in the distilling apparatus.

3. A cooling apparatus, which comprises in combination a refrigerator, a cooling tank positioned within said refrigerator and containing a freezing mixture of water ice and a liquid which is soluble in water, a distilling apparatus positioned outside of the refrigerator whereby the aqueous solution formed in the cooling tank by melting of the ice may be separated into its components, a conduit between said cooling tank and said distilling apparatus, whereby liquid from said cooling tank is conducted to said distilling apparatus, and another conduit between said distilling apparatus and said cooling tank through which condensate formed in the distilling apparatus is conducted to the cooling tank, said second mentioned conduit having a liquid seal formed of condensate produced in the distilling apparatus and said first mentioned conduit being provided with a liquid seal formed of the brine produced in the cooling tank through the melting of the ice.

4. A method of cooling which comprises effecting cooling by a freezing mixture containing water ice and methyl alcohol and subsequently recovering the methyl alcohol by separating it from the water formed by the melting water ice by subjecting the mixture of water and methyl alcohol to a process of distillation and then returning the recovered alcohol for reuse.

5. A method of cooling a space for the reception of articles to be cooled which comprises bringing together in said space water ice and a liquid soluble in water and having a boiling point substantially lower than that of water to form a freezing mixture, and subsequently separating said liquid from the water formed by the melting water ice by subjecting the mixture to distillation outside of said space and returning the separated liquid to said space for reuse with water ice, substantially as described.

PETER SCHLUMBOHM.